United States Patent
Shiraishi et al.

(10) Patent No.: US 6,173,485 B1
(45) Date of Patent: *Jan. 16, 2001

(54) METHOD FOR MANUFACTURING MAGNETIC HEAD APPARATUS WITH SLIDER AND SUSPENSION

(75) Inventors: Masashi Shiraishi; Masanori Sakai; Tsuyoshi Umehara; Haruyuki Morita; Ken-ichi Takano, all of Nagano (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/216,851

(22) Filed: Dec. 21, 1998

(30) Foreign Application Priority Data

Dec. 26, 1997 (JP) .................................................. 9-366608

(51) Int. Cl.$^7$ .......................................................... G11B 5/42
(52) U.S. Cl. ..................................... 29/603.06; 29/603.04; 360/103; 360/104
(58) Field of Search ........................... 29/603.03, 603.04, 29/603.05, 603.06; 360/103, 104, 108

(56) References Cited

U.S. PATENT DOCUMENTS 3,563,443  * 2/1971  Pedrotti et al. .............................. 228/1
4,799,119  * 1/1989  Rossi et al. ................................. 360/123
5,687,479  * 11/1997 Bennin et al. ................................. 29/885
5,859,749  * 1/1999  Zarouri et al. ............................... 360/104
5,870,258  * 2/1999  Khan et al. ................................... 360/104

FOREIGN PATENT DOCUMENTS

| 53-69623 | 6/1978 | (JP) . |
| 54-94312 | 7/1979 | (JP) . |
| 55-150130 | 11/1980 | (JP) . |
| 3-108120 | 5/1991 | (JP) . |
| 3-134875 | 5/1991 | (JP) . |

* cited by examiner

Primary Examiner—Carl E. Hall
(74) Attorney, Agent, or Firm—Arent Fox Kintner Plotkin & Kahn PLLC

(57) ABSTRACT

A method for manufacturing a magnetic head apparatus includes a step of forming a plurality of flexure pieces coupled with each other and kept in substantially flat, each of the flexure pieces being provided with conductive connection pattern, a step of mounting sliders with magnetic head elements on the respective flexure pieces, or mounting head IC chips on the respective flexure pieces and after that mounting sliders with magnetic head elements on the respective flexure pieces, and a step of separating the flexure pieces with the sliders into individual pieces.

21 Claims, 3 Drawing Sheets

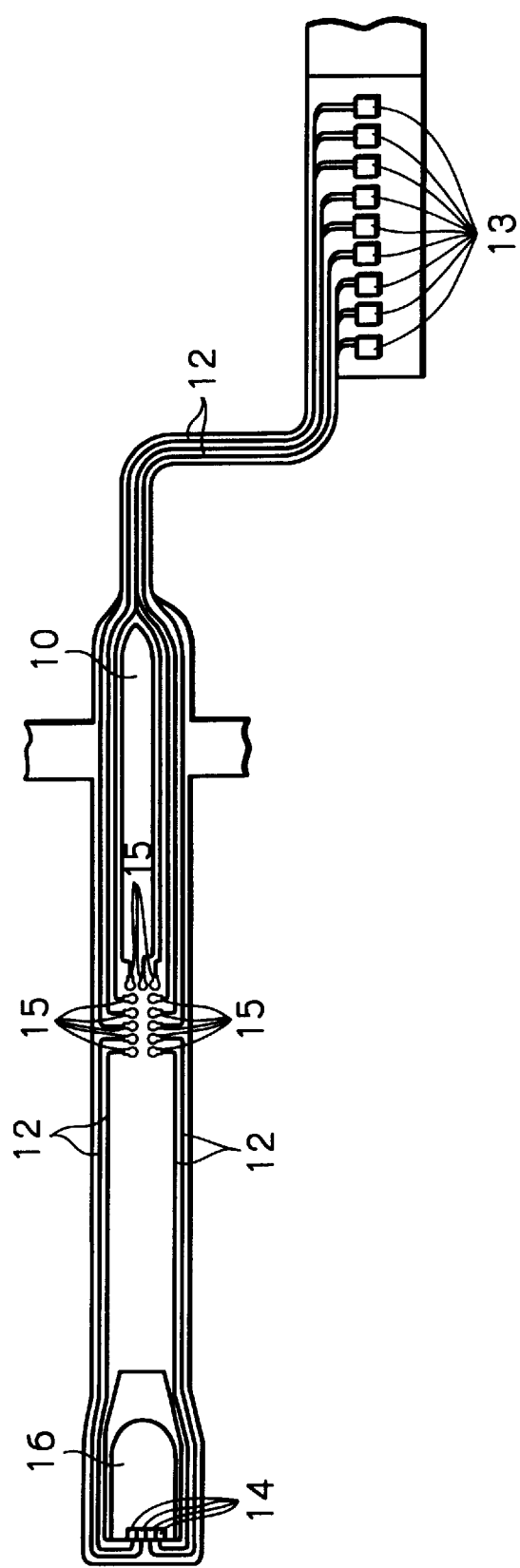

METHOD FOR MANUFACTURING MAGNETIC HEAD APPARATUS WITH SLIDER AND SUSPENSION

FIELD OF THE INVENTION

The present invention relates to a method for manufacturing a magnetic head apparatus, which includes a slider with at least one thin-film magnetic head element, a resilient suspension for supporting the slider.

DESCRIPTION OF THE RELATED ART

In such magnetic head apparatus, at least one thin-film magnetic head element for writing magnetic information into and/or reading magnetic information from a magnetic recording medium such as a magnetic disk is in general formed on a slider flying in operation above the magnetic recording medium. The slider is supported by the suspension made of a resilient thin metal plate.

A head IC chip used for amplifying writing current to the magnetic head element, for amplifying reading current from the head element and for controlling the writing and reading operations of the head element may be also mounted on the suspension. Japanese patent unexamined publications nos. 53(1978)-69623, 55(1980)-150130 and 3(1991)-108120 disclose magnetic head apparatuses with the head IC chips mounted on the suspensions.

In fabricating these conventional magnetic head apparatuses, the sliders and the head IC chips are mounted on the respective suspensions after bend portions called as "gram-loads" and side rail bend portions for reinforcement are formed in the suspensions. For example, Japanese patent unexamined publications nos. 54(1979)-94312 and 3(1991)-134875 disclose manufacturing processes for attaching sliders onto respective completed suspensions which are coupled to each other and thereafter for separating the coupled suspensions into the individual pieces.

As aforementioned, since the completed suspension according to the conventional art has a complicated three dimensional shape, fixing of the suspension itself to an assembling tool or a jig used for mounting the slider and the head IC chip becomes very difficult. Thus, precise alignment of the suspension with the slider and the head IC chip cannot be expected causing that assembling of the slider and the head IC chip with the suspension cannot be automated.

SUMMARY OF THE INVENTION

It is therefore an object of the present invention to provide a method for manufacturing a magnetic head apparatus, whereby extremely accurate assembling of a slider and/or a head IC chip with a suspension can be expected.

Another object of the present invention is to provide a method for manufacturing a magnetic head apparatus, whereby assembling of the slider and the head IC chip with the suspension can be easily automated.

According to the present invention, a method for manufacturing a magnetic head apparatus includes a step of forming a plurality of flexure pieces coupled with each other and kept in substantially flat, each of the flexure pieces being provided with conductive connection pattern, a step of mounting sliders with magnetic head elements on the respective flexure pieces, or mounting head IC chips on the respective flexure pieces and after that mounting sliders with magnetic head elements on the respective flexure pieces, and a step of separating the flexure pieces with the sliders or with both the sliders and the head IC chips into individual pieces.

Since the head IC chips and the sliders are mounted on the flexure pieces coupled with each other and kept in substantially flat, the alignment and mounting of the head IC chips and the sliders to the respective flexure pieces can be accurately and easily executed, and thus extremely accurate assembling of the head-suspension assemblies can be expected. This accurate assembling will greatly improve characteristics of the magnetic head apparatus. Furthermore, assembling of the sliders and the head IC chips with the suspensions can be easily automated. Thus, the manufacturing costs of the fabricated magnetic head apparatus can be reduced without sacrificing quality.

In case of fabricating a magnetic head apparatus with a three-piece structure suspension formed from discrete components of a flexure piece and a load beam, the load beam is fixed to the flexure piece after the slider is mounted on the flexure piece. Thus, the center of the slider can be extremely easily aligned with a dimple, which will be normally formed on the load beam.

It is preferred that the head IC chips are mounted on the respective flexure pieces by flip chip bonding process.

It is also preferred that each of the flexure pieces has a tongue portion for fixing the slider, and that the tang portions of the respective flexure pieces are bent so as to adjust position angles of the sliders to be attached. This tongue portion bending step may be executed before the head IC chips and the sliders are mounted, after the head IC chips and the sliders are mounted but before the coupled flexure pieces are separated into individual pieces, or after the coupled flexure pieces are separated into individual pieces.

In case of fabricating a magnetic head apparatus with a two-pieces structure suspension formed from integral flexure piece and load beam, bending process of the flexure piece integral with the load beam is executed after the head IC chips and the sliders are mounted but before the coupled flexure pieces are separated into individual pieces, or after the coupled flexure pieces are separated into individual pieces.

It is also preferred that the plurality of flexure pieces coupled with each other are formed from a flat sheet material or from a rolled hoop material.

It is preferred that the sliders are provided with magnetoresistive (MR) type read out magnetic head elements on the respective flexure pieces.

Further objects and advantages of the present invention will be apparent from the following description of the preferred embodiments of the invention as illustrated in the accompanying drawings.

BRIEF DESCRIPTION OF THE DRAWINGS

FIG. 2 shows an enlarged plane view of a flexure piece under the process of FIG. 1a.

DESCRIPTION OF THE PREFERRED EMBODIMENTS

Figure 1A:
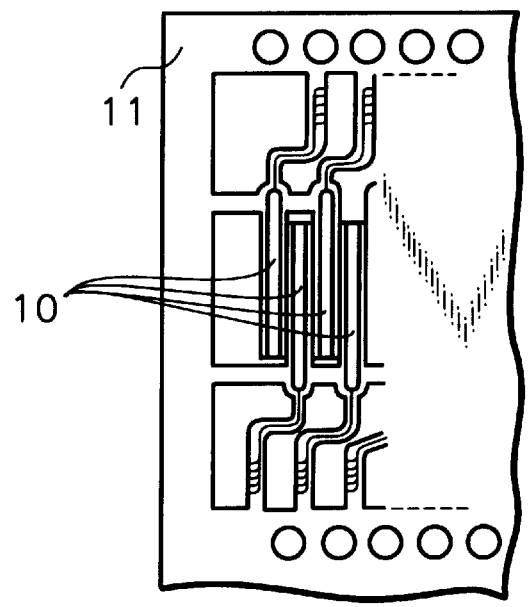
FIGS. 1a to 1c show plane views illustrating parts of processes of a preferred embodiment of a method for manufacturing a magnetic head apparatus according to the present invention.
Figure 1B:
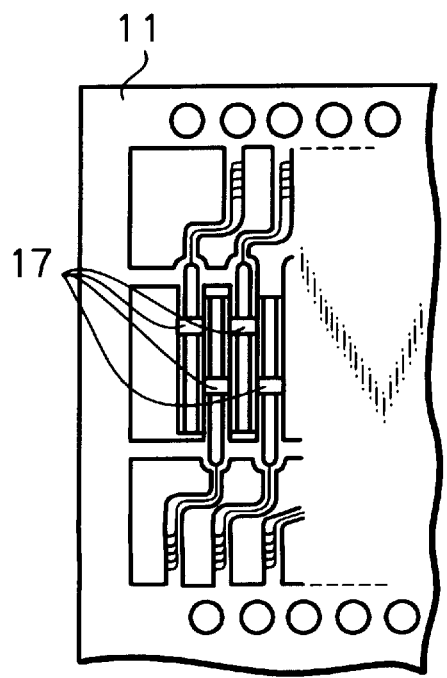
Figure 1C:
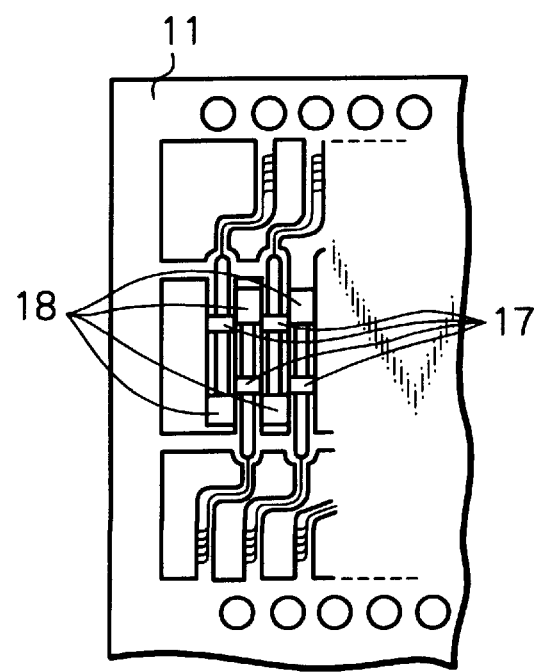

FIGS. 1a to 1c illustrate parts of fabricating processes of the preferred embodiment of the manufacturing method of the magnetic head apparatus according to the present invention. This embodiment relates to the magnetic head apparatus with a three-piece structure suspension formed from discrete components of a flexure, a load beam and a base plate.

First, on a flat thin metal plate or a flat metal sheet, a conductive layer with a thin-film conductive pattern that constitutes lead lines for each suspension is formed. This thin-film conductive pattern can be formed by a well-known method similar to the patterning method of forming printed circuits on a thin metal plate. Namely, the conductive pattern is formed by sequentially depositing a first insulation material layer made of a resin such as polyimide with a thickness of about 5 μm, a patterned Cu layer (conductive layer) with a thickness of about 4 μm, and a second insulation material layer made of a resin such as polyimide with a thickness of about 5 μm on the thin metal plate in this order. The thin metal plate is made of in this embodiment a stainless steel plate (for example SUS304TA) with a thickness of about 25 μm.

Then, as shown in FIG. 1a, the thin metal plate with thus formed conductive layer is partially cut by for example an etching process to form a flexure blank 11 on which a plurality of flexure pieces 10 partially coupled with each other are arranged. Each of the flexure pieces 10 does not have bend portions at this stage, and therefore the flexure blank 11 is kept in substantially flat.

FIG. 2 illustrates an enlarged one of the flexure pieces 10 at this state. In the figure, reference numeral 12 denotes the conductive layer with the thin-film conductive pattern that constitutes the lead lines running along the longitudinal direction of the flexure piece 10. One end of the conductive layer 12 is connected to connection terminals 13 which will be connected to external circuits, and the other end of the conductive layer 12 is connected to connection terminals 14 which will be connected to terminals of a slider. On a middle portion of the conductive layer 12, connection pads 15 for a head IC chip are formed. Within the regions of the connection terminals 13 and 14 and also the connection pads 15, a Ni layer and an Au layer are sequentially deposited on the Cu layer and there is no second insulation material layer.

In FIG. 2, furthermore, reference numeral 16 denotes a tongue portion of the flexure piece 10 for carrying the slider. According to this embodiment, the tongue portion 16 is bent, at this stage namely before mounting the head IC chip and the slider, to adequately adjust a position angle of the slider that will be attached thereto.

Then, as shown in FIG. 1b, the head IC chips 17 are mounted on and connected to the connection pads 15 on the respective flexure pieces 10 of the flexure blank 11. Each of the head IC chips 17 in this embodiment is formed by a bear chip and thus mounted on the pads 15 by flip chip bonding.

Thereafter, as shown in FIG. 1c, the sliders 18 with magnetic head elements such as MR read out elements are mounted on the tang portions 16 of the respective flexure pieces 10 of the flexure blank 11.

As mentioned above, according to this embodiment, the head IC chips 17 and the sliders 18 are mounted on the substantially flat flexure blank 11. Therefore, the alignment and mounting of the head IC chips and the sliders to the respective flexure pieces can be accurately and easily executed, and thus extremely accurate assembling of the head-suspension assemblies can be expected. Furthermore, assembling of the sliders and the head IC chips with the suspensions can be easily automated. Thus, the manufacturing costs of the fabricated magnetic head apparatus can be reduced without sacrificing quality.

Figure 3:
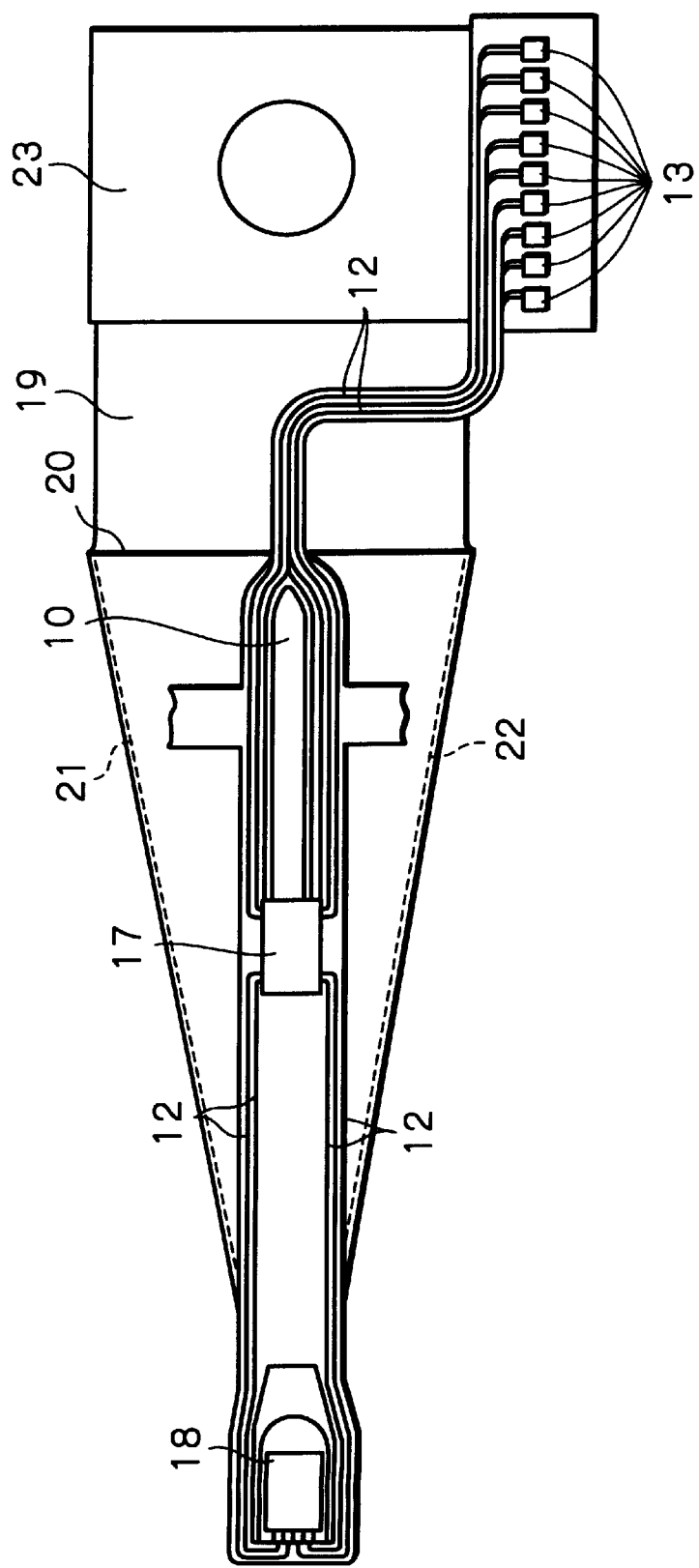
FIG. 3 shows a plane view of the magnetic head apparatus with a load beam and the flexure fixed to the load beam in the embodiment shown in FIGS. 1a to 1c.

Thereafter, the coupled flexure pieces 10 on which the head IC chips 17 and the sliders 18 are mounted are separated into individual pieces. Then, as shown in FIG. 3, a load beam 19 at which a bend portion of "gram-load" 20 and side rail bend portions for reinforcement 21 and 22 are preliminarily formed is fixed on the bottom surface of the flexure piece 10. The flexure piece 10 and the load beam 19 constitute the fundamental portion of the suspension. In FIG. 3, reference numeral 23 denotes a base plate attached to the end portion of the load beam 19.

The load beam 19 is made of in this embodiment a stainless steel plate with a thickness of about 70–75 μm and supports the flexure piece 10 along its whole length. This load beam 19 has a shape with a width that narrows with approaching to its top end. Fixing of the flexure piece 10 with the load beam 19 is achieved by means of a plurality of welded spots.

Since the flexure piece 10 is fixed to the load beam 19 after the slider 18 is mounted on the flexure piece 10, the center of the slider 18 can be extremely easily aligned with a dimple which will be normally formed on the load beam 19.

In a modification of the present invention, the bending work of the tongue portions 16 of the respective flexure pieces to adjust position angles of the sliders to be attached may be executed after the head IC chips and the sliders are mounted but before the flexure pieces are separated. In a further modification of the present invention, the bending work of the tongue portions 16 of the respective flexure pieces may be executed after the flexure pieces are separated.

In the aforementioned embodiments, each suspension has the three-piece structure in which the flexure, the load beam and the base plate are individually formed. In case of a two-pieces structure suspension in which the flexure and the load beam are integral from the beginning, bending works of the flexure pieces and the load beam, namely forming of bend portion of "gram-load" and side rail bend portions for reinforcement will be executed after the head IC chips and the sliders are mounted but before the flexure pieces (load beams) are separated, or executed after the flexure pieces (load beams) are separated.

Although the flexure blank 11 is made from a flat thin metal plate in the aforementioned embodiments, such the flexure blank can be made in another embodiment by roll to roll process using a rolled hoop material as TAB (Tape Automated Bonding) process.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for manufacturing a magnetic head suspension assembly comprising the steps of:

forming a plurality of flexure pieces, each having a tongue portion, coupled with each other and lying flat over their entire combined surfaces exterior to the tongue portions, each of said flexure pieces being made of a metal plate and provided with a conductive connection pattern formed on the metal plate;

mounting sliders with magnetic head elements on the tongue portions of the respective flat flexure pieces;

fixing said flexure pieces with the mounted sliders to load beams; and separating said flexure pieces with the mounted sliders into individual pieces, said fixing step being executed before or after said separating step.

2. The method as claimed in claim 1, wherein said method further comprises mounting head IC chips on the respective flexure pieces before said slider mounting step is executed.

3. The method as claimed in claim 2, wherein said head IC chip mounting step includes mounting the head IC chips on the respective flexure pieces by flip chip bonding process.

4. The method as claimed in claim 2, wherein said method further comprises bending the tongue portions of the respective flexure pieces so as to adjust a static attitude of the sliders to be attached, said tongue portion bending step being executed before said head IC chips and said sliders are mounted.

5. The method as claimed in claim 2, wherein said method further comprises bending the tongue portions of the respective flexure pieces so as to adjust a static attitude of the sliders to be attached, said tongue portion bending step being executed after said head IC chips and said sliders are mounted but before said coupled flexure pieces are separated into individual pieces.

6. The method as claimed in claim 2, wherein said method further comprises bending the tongue portions of the respective flexure pieces so as to adjust a static attitude of the sliders to be attached, said tongue portion bending step being executed after said coupled flexure pieces are separated into individual pieces.

7. The method as claimed in claim 1, wherein said method further comprises fixing a load beam to each of the separated flexure pieces.

8. The method as claimed in claim 1, wherein said forming step includes forming the plurality of flexure pieces coupled with each other from a flat sheet material.

9. The method as claimed in claim 1, wherein said forming step includes forming the plurality of flexure pieces coupled with each other from a rolled hoop material.

10. The method as claimed in claim 1, wherein said mounting step includes mounting sliders with magnetoresistive type read out magnetic head elements on the respective flexure pieces.

11. A method for manufacturing a magnetic head suspension assembly comprising the steps of:

forming a plurality of flexure pieces, each having a tongue portion, coupled with each other and lying flat over their entire combined surfaces exterior to the tongue portions, each of said flexure pieces being made of a metal plate and provided with a conductive connection pattern formed on the metal plate;

mounting sliders with magnetic head elements on the tongue portions of the respective flat flexure pieces;

bending said flexure pieces with the mounted sliders; and separating said flexure pieces with the mounted sliders into individual pieces, said bending step being executed before or after said separating step.

12. The method as claimed in claim 11, wherein said method further comprises mounting head IC chips on the respective flexure pieces before said slider mounting step is executed.

13. The method as claimed in claim 12, wherein said head IC chip mounting step includes mounting the head IC chips on the respective flexure pieces by flip chip bonding process.

14. The method as claimed in claim 12, wherein said method further comprises bending the tongue potions of the respective flexure pieces so as to adjust a static attitude of the sliders to be attached, said tongue portion bending step being executed before said head IC chips and said sliders are mounted.

15. The method as claimed in claim 12, wherein said method further comprises bending the tongue portions of the respective flexure pieces so as to adjust a static attitude of the sliders to be attached, said tongue portion bending step being executed after said head IC chips and said sliders are mounted but before said coupled flexure pieces are separated into individual pieces.

16. The method as claimed in claim 12, wherein said method further comprises bending the tongue portions of the respective flexure pieces so as to adjust a static attitude of the sliders to be attached, said tongue portion bending step being executed after said coupled flexure pieces are separated into individual pieces.

17. The method as claimed in claim 12, wherein said method further comprises bending each of the flexure pieces, said flexure bending step being executed after said head IC chips and said sliders are mounted but before said coupled flexure pieces are separated into individual pieces.

18. The method as claimed in claim 12, wherein said method further comprises bending each of the flexure pieces, said flexure bending step being executed after said coupled flexure pieces are separated into individual pieces.

19. The method as claimed in claim 11, wherein said forming step includes forming the plurality of flexure pieces coupled with each other from a flat sheet material.

20. The method as claimed in claim 11, wherein said forming step includes forming the plurality of flexure pieces coupled with each other from a rolled hoop material.

21. The method as claimed in claim 11, wherein said mounting step includes mounting sliders with magnetoresistive type read out magnetic head elements on the respective flexure pieces.

* * * * *